Sept. 27, 1966  J. A. PHILLIPS ET AL  3,275,916
HIGH Q POWER CAPACITOR

Filed Feb. 15, 1960                                           2 Sheets-Sheet 1

INVENTORS
James A. Phillips
Aldred E. Schofield
BY

Sept. 27, 1966    J. A. PHILLIPS ET AL    3,275,916
HIGH Q POWER CAPACITOR
Filed Feb. 15, 1960    2 Sheets-Sheet 2

INVENTORS
James A. Phillips
Aldred E. Schofield

United States Patent Office 3,275,916
Patented Sept. 27, 1966

3,275,916
HIGH Q POWER CAPACITOR
James A. Phillips and Alfred E. Schofield, Los Alamos, N. Mex., assignors to the United States of America as represented by the United States Atomic Energy Commission
Filed Feb. 15, 1960, Ser. No. 8,892
4 Claims. (Cl. 317—260)

This invention relates to capacitors of the power type, and particularly power capacitors for ultra high frequency (megacycle) operation. Electrical energy storage capacitors are either of the wound type or the flat laminated type. The present invention concerns itself with a capacitor of the flat laminated type having an exceedingly high Q, low effective resistance and low inductance.

Energy dissipation in capacitors operating at high frequencies occurs in the dielectric and, due to skin effect, in the capacitor leads and conducting electrodes. At very high frequencies, of the order of megacycles, the structure of the capacitors of the prior art is such that serious energy losses are present, due to the skin effect phenomena.

It is understood that the term "high frequency" in this connection means any high time rate of change of voltage $$\left(\frac{dv}{dt}\right)$$

or current $$\left(\frac{di}{dt}\right)$$

The utilization of power capacitors for generating gaseous plasmas for research purposes, as well as for industrial uses such as impulse welding and fast light sources, have made it more and more important that the duration of discharge and the losses in such capacitors be reduced to the absolute minimum. Such capacitors are frequently utilized in banks totaling megajoules so that it is appreciated that an increase in efficiency of such capacitors may result in very appreciable savings in electrical energy. In addition, it is desirable that capacitors be enabled to discharge as rapidly as possible in order to obtain peak energies of maximum possible magnitude. The rate of discharge is determined by the inductance and resistance of the capacitors and their associated conductors so that it is necessary that both the inductance and resistance be reduced to the absolute minimum.

It is, accordingly, a main objective of the present invention to provide a capacitor of the flat laminated type having such structure that its resistance and inductance at high frequencies is minimized.

Another important objective is to provide a capacitor of the flat laminated type on which the terminals are so arranged that the capacitor and its associated circuitry to a load has reduced resistive and inductive impedance.

These objectives and other objectives and advantages of the present invention will become apparent as this description proceeds with reference to the drawing in which FIGURE 1 is a drawing of the flat laminated capacitors of the prior art;

Figure 1:
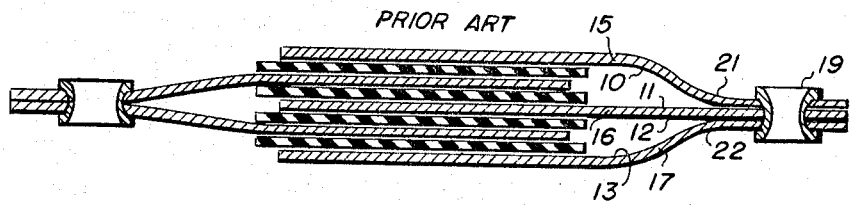

The capacitor of the prior art, as shown in FIGURE 1, was considered to have excellent low loss characteristics, particularly if the dielectric were mica or equivalent low loss material. However, it has been determined, as a matter of fact, that this type of capacitor, when utilized for the almost instantaneous discharge of large amounts of electrical energy, has quite appreciable energy loss characteristics. The reason for this is explained with reference to the construction shown. At high frequencies currents travel only through a very thin surface zone of conductors as a result of skin effect. Therefore, surfaces 10, 11, 12 and 13 are conducting surfaces for electrode plates 15, 16 and 17. These plates extend outward from the laminated structure of the capacitor proper and are squeezed together and are joined, as for example, by eyelet 19, which provides a terminal. It is seen that from that point at which the electrodes are pressed together only two surfaces 21 and 22, of appreciable area remain to carry the current. The currents from the inside surfaces 10, 11, 12 and 13 must travel around the surfaces of the conductors to appear on the outside two surfaces 21 and 22, and in so doing must travel an elongated circuitous high resistance path. Furthermore, although the capacitor plates are parallel in the capacitor, they are joined together adjacent the terminal so that they become a single conductor having an inductance related to single conductor geometry.

In accordance with the present invention, the structure of the electrodes which extend to the terminal, and the terminal itself, are novel and eliminate the above-described deficiencies.

Figure 3:
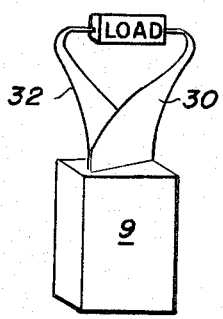
FIGURE 3 is a schematic representation of a capacitor and external circuitry in accordance with the present invention.
Figure 2:
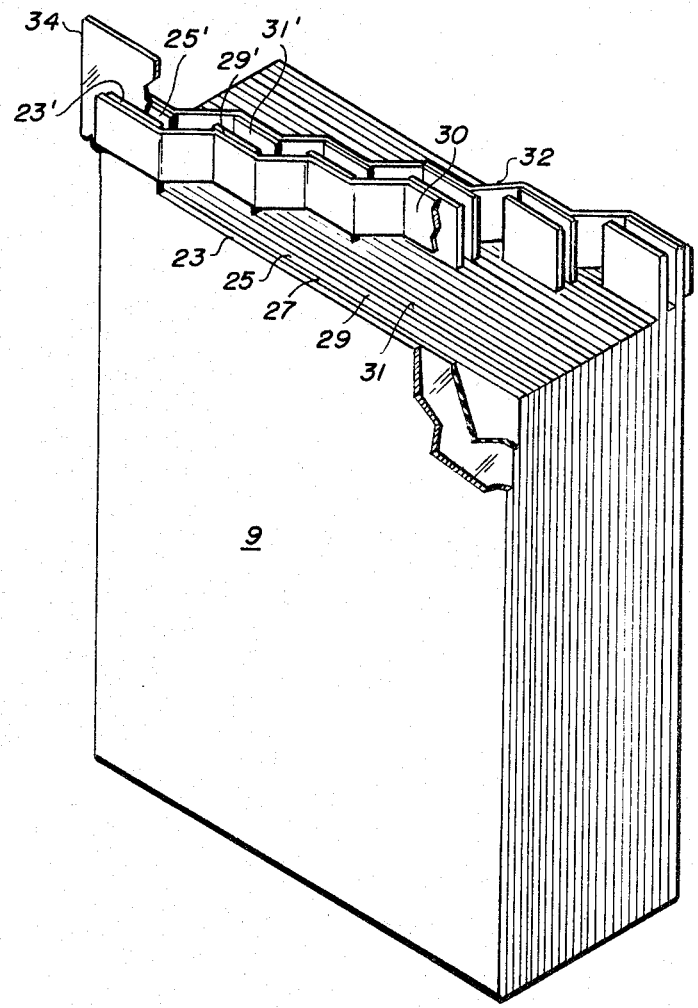
FIGURE 2 is a preferred embodiment of a capacitor in accordance with the present invention.

Referring to FIGURE 2, it is seen that capacitor 9 is comprised of plates separated by dielectric sheets in the usual manner. In accordance with the present invention each plate is provided with a terminal projecting out of a single edge of the laminated capacitor structure. That is, each plate is provided with an extending tab and the tabs of successive like polarity plates are located offset relative to each other so that they are distributed along the edge of the capacitor and can be electrically joined by a terminal conductor of large surface area. Specifically, capacitor plate 23 and capacitor plate 25 are of opposite polarity and separated by a sheet of dielectric 27. Plate 23 is provided with terminal tab 23' and plate 25 is provided with terminal tab 25'. The next pair of adjacent plates are provided with terminal tabs 29' and 31', et cetera. Each pair of terminal tabs are laterally adjacent and adjacent pairs of terminal tabs are longitudinally spaced along the edge of the capacitor assembly. The terminal tabs of all the plates of one polarity are thus so disposed that a single large area transmission line, or terminal 30, is connected thereto. The plates of the opposite polarity are connected to a second similar transmission line 32. The two transmission lines may be air-insulated from each other, although, preferably, a sheet of dielectric 34 is interposed therebetween. Although the terminal plates 30 and 32, shown in FIGURE 2, are of limited width for purposes of clarity, it is advantageous in certain applications that the terminal plates 30 and 32 be continuous to the load, as shown in FIGURE 3. As a result of this mode of connection, it is seen that all the capacitor plates of a like polarity are connected in parallel to a terminal conductor of extensive surface area. It is also seen that the currents from each capacitor plate have a direct path into their terminal connection and that all the capacitor pair units are connected in parallel.

Figure 5:
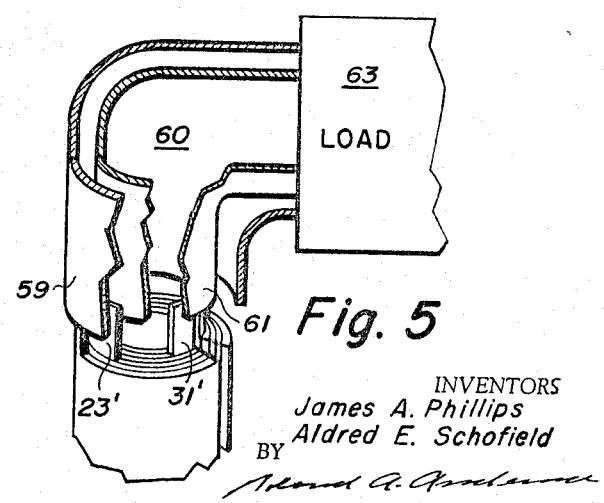
FIGURE 5 is a fragmentary representation of a capacitor in accordance with the present invention in combination with a coaxial transmission line and load.

Another advantageous embodiment of the capacitor of the present invention in combination with a transmission line and a load is shown in FIGURE 5. Here the capacitor of FIGURE 2 is formed into cylindrical form. As a matter of fact, each of the foils may be continuous cylinders, but such construction is subject to difficulties in fabrication. Consequently, from a practical point of view, a flat capacitor of the type of FIGURE 2 may simply be formed into circular shape. The result of this is that the tabs 23′, along with the remainder of the tabs of one of the two sets of plates, will form a spiral and the tabs 31′, along with the other tabs of the second set of plates, will form a second spiral parallel to the first spiral. The outer set of such tabs is connected to the outer conductor 59 and the inner spiral of tabs is connected to the inner conductor 61 of the coaxial transmission line 60. Although only a few of the terminal tabs are shown in FIGURE 5, the remainder being omitted for purposes of clarity, it is understood that the tabs shown are representative of the complete set shown in FIGURE 2. The coaxial line 60 forms a continuous transmission line from the capacitor to the load 63. This type of connection has the advantages of low losses, the ability to match impedances, and inherent safety in its utilization in that the outer conductor may be at ground potential. Two important beneficial characteristics of the coaxial transmission line in this application are that losses due to radiation are eliminated and the effect of such radiation on signal sensitive apparatus, such as radio receivers, is prevented.

In this connection, it is well known that the inductive reactance of equal inductances connected in parallel has a value which is inversely proportional to the number of such inductances. Likewise, for resistances connected in parallel. The structure of the capacitor connections of this invention permits of the paralleling of the inductances and resistances of the individual plates and their respective terminal tabs. As a result, the total inductance and resistance of the capacitor is meritoriously reduced below that possible in prior art capacitors.

Capacitors in accordance with the present invention have been tested in comparison with capacitors of the same general type of the prior art and the results are as follows: A capacitor of the type shown in FIGURE 2, having 0.51 μf. capacity, and connected to transmission lines as shown in FIGURE 2, has a Q of about 20,000 at 100 kc. and an inductance of $3 \times 10^{-10} h$; a capacitor of the same size and laminated construction, but with the foils continuously extended out to terminals, as in the prior art and as shown in FIGURE 1, has a Q of 900 at 100 kc. and has an inductance of $4.39 \times 10^{-8} h$.

Figure 4:
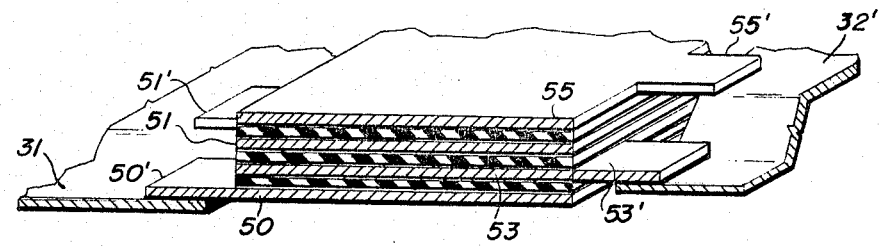
FIGURE 4 is another embodiment of a capacitor in accordance with the present invention.

Although the embodiment of FIGURE 2 is preferred, because in most cases the adjacent position of the terminal plates enables the utilization of the shortest distance to a load, as shown in FIGURES 3 and 5, it is possible in some cases that it may be preferred that the terminals be provided at opposite ends of the capacitor. This embodiment is shown in FIGURE 4. For purposes of clarity, only four plates, 50 and 51, and 53 and 55, are shown, although it is understood that the usual capacitor will have many such plates. Each of the plates is provided with a terminal tab 50′, 51′, 53′, and 55′ in a manner similar to that of FIGURE 2, except that the tabs of capacitor plates of one polarity extend out of one edge of the capacitor for connection to terminal bus 31′ and the tabs of the plates of opposite polarity extend out of the opposite edge of the capacitor for connection to terminal bus 32′. It is apparent that the advantages of offsetting the terminal tabs as explained with respect to FIGURE 2 applies also to this embodiment.

An additional desirable feature of the embodiment of FIGURE 2 resides in the ability to provide a transmission line of matching impedance between the capacitor and its load, thus preventing or reducing reflections and losses in the system.

While in accordance with the provisions of the statutes, we have illustrated and described the best form of this invention now known to us, it will be apparent to those skilled in the art that changes may be made in the form of the apparatus disclosed without departing from the spirit of this invention as set forth in the appended claims, and that in some cases certain features of this invention may sometimes be used to advantage without a corresponding use of other features.

What is claimed is:

1. A high Q power capacitor comprising a plurality of stacked electrode plates alternated with sheets of dielectric material, alternate ones of said plates constituting a set and selected for one terminal of said capacitor and the remainder of said plates constituting a second set and being selected for the other terminal, each of said plates having an elongated terminal tab extending out of one edge thereof, the width of said tab not exceeding the length of the plate edge divided by the number of plates in each set, each pair of adjacent plates having adjacent tabs and successive pairs of plates having their tabs progressively offset along the edge of the capacitor at least the width of a tab, a single terminal transmission line being electrically connected co-linearly to each of the plurality of terminal tabs of each set.

2. A high Q power capacitor comprising a plurality of stacked electrode plates, said plates being insulated one from another by sheets of dielectric material, alternate ones of said plates being selected for operation with one polarity of said capacitor and the remainder of said plates being selected for operation with opposite polarity, integral terminal tabs extending out of an edge of said plates, said terminal tabs having a width not exceeding the length of the corresponding plate edge divided by the number of plates of like polarity, the terminal tabs of the plates of one pole extending out of and being offset so as to be evenly spaced along one edge of the stack and the terminal tabs of the plates of the opposite polarity extending out of and being offset so as to be evenly spaced along the opposite edge of the stack, a single terminal transmission line connected to each of said sets of tabs.

3. A high Q power capacitor comprising a plurality of stacked electrode plates, said plates being insulated one from another by sheets of dielectric material, alternate ones of said plates being selected for operation with one polarity of said capacitor and the remainder of said plates being selected for operation with opposite polarity, integral terminal tabs extending out of an edge of said plates, the width of each of said tabs not exceeding the length of the plate edge divided by the number of plates in each set, each pair of adjacent plates having adjacent tabs and successive pairs of plates having their tabs progressively offset along the edge of the capacitor at least the width of a tab, said plurality of said stacked electrode plates being formed into cylindrical shape whereby the terminal tabs corresponding to one set of said plates lie in a spiral and the terminal tabs of the second set of plates lie in a second spiral inside of and spaced from the first spiral, a coaxial transmission line having its outer and inner conductors at one end connected to respective sets of said terminal tabs and the other end of said transmission line being connected to a load.

4. A capacitor comprising a plurality of alternating dielectric and metallic sheets, said metallic sheets each having a projecting tab extending from an edge thereof, said metallic sheets positioned in parallel aligned relation with the tabs of each adjacent pair of said metallic sheets aligned with one another and projecting in staggered relationship to tabs of adjacent pairs of metallic sheets, said tabs all extending from a single side of said capacitor, solid dielectric means extending between said tabs of said pairs of metallic sheets and a single terminal transmission line connected to each of the tabs on one side of said dielectric means and a second single terminal transmission line connected to each of the tabs on the other side of said dielectric means.

(References on following page)

References Cited by the Examiner

UNITED STATES PATENTS

| | | | |
|---|---|---|---|
| 942,620 | 12/1909 | Dearlove | 317—261 |
| 2,270,953 | 1/1942 | Manz | 317—260 |
| 2,279,826 | 4/1942 | Kater | 317—261 |
| 2,473,240 | 6/1949 | Byrne | 317—261 |
| 2,513,249 | 6/1950 | O'Brien | 317—261 |
| 2,917,688 | 12/1959 | Ritchey | 317—261 |

FOREIGN PATENTS 209,325  1/1924  Great Britain.

LARAMIE E. ASKIN, *Primary Examiner.*

SAMUEL BERNSTEIN, JOHN F. BURNS, ROBERT K. SCHAEFER, *Examiners.*

W. L. CARLSON, E. GOLDBERG, *Assistant Examiners.*